3,756,958
PROCESS FOR INCREASING SIZE OF SILICA PARTICLES IN AQUEOUS SILICA SOL
Ralph Kingsley Iler, Wilmington, Del., assignor to E. I. du Pont de Nemours and Company, Wilmington, Del.
No Drawing. Filed Apr. 12, 1972, Ser. No. 243,405
Int. Cl. B01j 13/00; C01b 33/14
U.S. Cl. 252—313 S          6 Claims

ABSTRACT OF THE DISCLOSURE

The size of silica particles in a hot alkaline colloidal silica sol can be increased by adding sodium silicate to the sol and removing sodium ions from the sol through a cation exchange membrane into an acid. Salt formed by migration of anions from the acid into the sol must be maintained within a concentration range determined by the concentration of silica in the sol.

BACKGROUND OF THE INVENTION

This invention concerns a process for producing concentrated aqueous sols of colloidal silica using a cation exchange membrane. The use of ion exchange resins for making silica sols is known. Bird, U.S. 2,244,325 and Iler and Wolter, U.S. 2,631,134, teach the removal of sodium ions from sodium silicate with ion exchange resins. Substitution of an ion exchange membrane for ion exchange resins provides significant advantages. Ion exchange resins require large volumes of dilute acids and bases for regeneration. In contrast, the effluent from the process using the ion exchange membrane is a relatively small volume of concentrated partially neutralized acid solution. This effluent presents less of a disposal problem than the effluent from the resin regeneration.

Several problems arise in the use of the ion exchange membrane in place of the ion exchange resin. One is that the membrane becomes impermeable if contacted with a sol containing silicate ions small enough to enter the pores in the membrane. This occurs if the pH of the sol rises above about 9.5 due to the addition of sodium silicate. Another problem is that a cation exchange membrane is not perfectly selective and there is some migration of anions from the acid into the sol through the cation exchange membrane. The anions combine with sodium ions from the sodium silicate added to form a salt. This salt adversely affects the stability of the sol at high concentrations. Thus, this invention includes not only the use of a cation exchange membrane, but also the control of salt content in the sol. This regulation of the pH and the salt concentration relative to the silica concentration in the sol is not taught in the prior art.

SUMMARY OF THE INVENTION

The size of silica particles in a hot alkaline aqueous silica sol is increased by adding sodium silicate to the sol and removing sodium ions from the sol through a cation exchange membrane. The silica sols have particles of at least 5 millimicrons in diameter, have a pH in the range of 8 to 9.5 and are at a temperature of about 60 to 100° C. The sols contain about 1 to about 40 weight percent colloidal silica solids. Sodium ions are removed from the sol by contacting the sol with one side of a cation exchange membrane having a strong acid on the opposite side of the membrane. As sodium ions are removed from the sol, sodium silicate is added to maintain the pH of the sol in the 8–9.5 range.

Cation exchange membranes are not perfectly selective so some acid anions migrate from the acid into the sol. These anions form a salt with the sodium ions added as sodium silicate. This salt adversely affects the stability of the sol at high concentrations. This process includes the step of removing the salt from the sol so that the total concentration of sodium ions in the sol is maintained within a range related to the concentration of the sol. When the sol contains less than 30% silica the total concentration of sodium ions is maintained from $N=0.005$ to $N=0.26-0.005C-0.0012\,(T-40)$ where N is the normality of sodium in the sol, T is the temperature in degrees centigrade, and C is the concentration of silica in grams per 100 mils of sol. When C is at least 30, $N=0.005$ to $N=0.158-0.0012T$.

DESCRIPTION OF THE PREFERRED EMBODIMENTS

Colloidal silica is produced by the exchange of hydrogen ions for sodium ions in a solution of sodium silicate. Particles formed initially are quite small, but these serve as nuclei and continued addition of sodium silicate and liberation of active silica by removal of sodium ions causes growth of the originally formed particles rather than formation of more small particles. Nuclei are silica particles which are being grown in size by accretion of active silica. In order to achieve particle growth rather than formation of new particles the temperature of the sol should be maintained from about 60 to about 100° C. The upper limitation on temperature is one of practicability. Higher temperatures can be used in equipment capable of operating at higher temperatures.

The pH of the sol must be maintained from 8 to 9.5. At pH's less than 8, silica sols are not stable. Agglomerates of colloidal particles form and the silica sol can gel. This effect grows more pronounced as the concentration of the sol increases. In very dilute sols, low pH's can be tolerated but in general they should be avoided.

Iler and Wolter, U.S. 2,631,134 taught that the pH of sols could be as high as 10.5 when ion exchange resin was used. However, at pH's higher than 9.5, silicate ions are present. While these do not interfere with ion exchange resins, they do penetrate an ion exchange membrane, gel, and plug it. Therefore the operating range for this process is restricted to pH's from 8 to 9.5. A pH of 9 is preferred.

Addition of sodium silicate introduces active silica to the sol and increases the pH of the sol. As the sol is circulated past the ion exchange membrane the sodium ions in the sol are replaced by hydrogen ions and the pH falls. The rate of sodium silicate addition and rate of circulation of the sol must be coordinated with the rate of ion exchange through the membrane so that the sol entering the ion exchange apparatus will have a pH no higher than 9.5 and sol leaving the ion exchanger will have a pH no lower than about 8. Note that sufficient circulation rates should be provided so that low pH regions do not develop adjacent to the membrane. While turbulent flow past the membrane is not a necessity, it is preferred. Similarly, the sol should be agitated sufficiently so that high pH's and high sodium concentrations are avoided at the point of sodium silicate addition.

The sodium silicate used in this process can have a mole ratio of $SiO_2$ to $Na_2O$ from 1:1 to 4:1. A ratio of 3.25:1 is preferred.

The rate at which sodium silicate is added to the system and thus the rate of forming active silica in the system is also important in maintaining the growth of the nuclei or particles without forming new nuclei. Once a new "family" of particles appears, then the sol contains particles of two sizes and is in this sense heterogeneous. For some uses such heterogeneous sols may be used but in most applications a sol of particles generally uniform is preferred.

As has been explained by Bechtold and Snyder in U.S. Pat. 2,574,902 (1951) and further defined by W. L. Albrecht in U.S. Pat. 3,440,174 (1969), and by M. Mindick and P. Vossos in U.S. Pat. 3,538,015 (1970) the rate of addition of active silicate to the system (in this case the silica in the added sodium silicate) must not exceed the rate at which the surface of the silica particles in the system can accept the silica and be grown thereby. If this addition rate is exceeded for a time long enough to supersaturate the system with active silica, the latter polymerizes and forms new very small nuclei which thereafter compete with the larger particles in taking up active silica.

If, for example, a relatively large membrane area is used while circulating a relatively small volume of sol, it could readily happen that the rate of addition of sodium silicate, required to maintain the pH in the necessary range about 9, will introduce active silica faster than the surface of the silica particles in the sol can absorb it and a new smaller family of silica nuclei will be formed. A uniform sol can be made by following the teachings of the art and insuring that enough silica nuclei of a given size are present to provide adequate silica surface for absorbing active silica at the rate it is being formed which in turn is primarily fixed by the rate at which the membrane can remove sodium and add hydrogen ions to the sol.

The total amount of sodium silicate (and thus sodium) that can be added to the sol during a run is limited. Only about 90% of the incoming sodium passes through the membrane. About 10% remains as sodium sulfate because it is neutralized by sulfate ions leaking from the acid side. The exact amount of sulfate leakage varies with the type of membrane and other conditions but in typical membranes used in this invention, it was usually enough to convert to sulfate about 10% of the sodium added as silicate.

If none of the sodium accumulating in the accumulating silica sol is removed, it eventually exceeds the concentration range in which the sol is stable and the sol will aggregate.

The membranes used for cation exchange in this process must be impermeable to colloidal silica particles larger than 5 millimicrons in diameter. The membranes should also selectively allow passage of cations and resist passage of anions. Available membranes are not prefectly selective and some anion migration occurs. Membranes where the ratio of cations to anions transferred is at least 8 are suitable for this process. Various ion exchange polymers have been formed into sheets. The particular polymer used is not critical so long as it can be formed into a membrane which will have a good ion exchange rate and will withstand process pressure and temperature. The membrane should also withstand contact with 5% NaOH, which is used to clean deposited silica. Tensile strength on the order of several thousand pounds per square inch is preferable.

Practical, strong, tough membranes containing cation exchange anionic groups as part of the polymer structure are described in U.S. 3,282,875, issued to Donald James Connolly and Williams Franklin Gresham, Nov. 1, 1966 (E. I. du Pont de Nemours & Co.). These are polymeric fluorocarbon vinyl ethers containing sulfonyl fluoride groups which are polymerized and then the sulfonyl fluoride is hydrolyzed with alkali to form the sodium sulfonate derivative of the polymer. In membrane form, this sodium salt is readily converted to the hydrogen form, and vice versa. The polymer can be fabricated into thin-walled tubing or thin, flexible, strong membranes, the wall or membrane thickness being as low as 0.005″.

The membranes may be placed between solid spacers in such a way that two different solutions can be circulated through channels parallel to the surface of the membrane on opposite sides. Alternatively, tubing such as 0.100 inch in diameter with a wall thickness of 0.005 inch is passed through close-fitting holes in a header or container, and cemented in place, for example, with epoxy cement. In this way, hundreds of parallel tubes running from one header to a second header can be arranged, and the tubes immersed in a separate container or vessel. One solution, preferably the colloidal silica, is passed from one header to another through the tubing, and the second solution, preferably the acid, surrounds the tubes. The acid is circulated around the tubes. The sol is circulated through the tubes from a hold tank. The equipment used can be suited to batch or continuous operation. One ion exchange unit can be used or a series of separate units can be employed.

Strong mineral acids are used in this process. Ether hydrochloric acid or sulfuric acid is suitable. Sulfuric acid is the preferred acid.

The rate of exchange of hydrogen for sodium ions through the membrane depends on the concentration of hydrogen ions in the acid solution, which diminishes as the acid is progressively neutralized. The rate of exchange initially is about proportional to the strength of the acid up to a concentration of hydrogen ions of one equivalent per liter; above this acid concentration there is little increase in rate, but stronger acid provides a reserve so that the rate does not immediately begin to drop as exchange progresses. The leakage of anions into the sol is proportional to the exchange rate so that it is higher with stronger acid.

Since the membranes are not perfectly selective and anions migrate from the acid to the sol as sodium and hydrogen ions continue to be exchanged, the sol will contain electrolyte as the sodium salt of the anion in increasing amounts. Very dilute silica sols can contain some electrolytes with no adverse effect on the sols. However as the concentration of silica in the sol increases, the amount of electrolyte which will cause aggregation of the particles or gelling of the sol, decreases. In order to prevent gelling and aggregation, the sodium normality in the sol should be maintained from $N=0.005$ to $N=0.26-0.005C-0.0012(T-40)$ where N is normality of sodium ions, T is the temperature in degrees centigrade and C is concentration of silica in grams per 100 milliliters. This relation applies to sols where C is less than 30. When C is at least 30, concentration of sodium from $N=0.005$ to $N=0.158-0.001(T-40)$ can be maintained. Since the viscosity of concentrated sols increases rapidly as electrolyte content is decreased, it is preferred that when C is at least 30, N is maintained from 0.02 to 0.03. It should be noted that the sodium ions in the sol are present both as the salt of anions which have migrated through the exchange membrane and as counter ions to the negatively charged silica particles.

In view of this relation between sol electrolyte content and stability, it is an essential step in this process to remove sodium salts from the sols to maintain the silica-sodium concentration relationship defined above. There are several methods available for removing salts from sols. The art is familiar with the use of ion exchange resins for salt removal. See Rule, U.S. 2,577,484 and U.S. 2,577,485. However, as stated above, the regeneration of these resins presents a waste disposal problem. The preferred method according to this invention is salt removal by ultrafiltration.

Microporous membrane filtration or ultrafiltration is the use of a filter having pores of such size that water and soluble salts will pass through the pores, but particles of colloidal size, such as 5 to 50 millimicrons, will not pass. The pore size of the membrane is selected so that the pore diameter is smaller than the particles in the sol, so that the particles cannot pass through. On the other hand, one should use a filter membrane having the largest sized pores that will not pass the particular size of silica particles present, since larger pores permit the water and the sodium sulfate solution to be removed from the silica more rapidly.

While membranes having pore diameters greater than 10 millimicrons are useful for the purpose of this invention, membranes with pore diameters less than 10 millimicrons are preferred. Membranes and filtration equipment resistant to alkali should be employed, since removing residual or deposited silica from the apparatus from time to time with warm 5% sodium hydroxide solution is highly beneficial.

The manner of operating the ultrafilter will be apparent to those skilled in the art, e.g., pressures, filtration rates, and circulation rates. Generally speaking, the sol being ultrafiltered to remove water and sodium salts should be circulated past the surface of the membrane or otherwise agitated to prevent concentration polarization. This is particularly important in the case of colloidal silica, since a layer of highly concentrated silica sol at the surface of the membrane should not be permitted to form since, unlike many organic colloids, the silica may spontaneously gel if the concentration exceeds a certain value. A degree of turbulence or circulation velocity should be employed such that a further increase in turbulence or velocity does not cause a proportionately greater rate of flow through the filter, as is known to those skilled in the art.

It is an essential feature of this invention that as the silica sol is concentrated by the removal of sodium salt solution through the ultrafilter, water must be added to the sol so that the concentration of silica in the sol does not exceed a maximum level determined by the concentration of sodium sulfate in the sol as described above. As salt is removed from the sol, higher silica concentrations can be attained without danger of aggregation of the particles. Conversely, the higher the concentration of sodium salt, particularly at the beginning of the ultrafiltration step, the more critical are the upper limits of silica concentration and temperature.

The temperature of the solution during ultrafiltration should not exceed a certain point, which is related to the sodium concentration and the silica concentration as defined in the equation previously described. In general, it is desirable to operate the ultrafiltration step at as high a temperature as possible, since the rate of filtration increases markedly with temperature. However, an elevated temperature is not essential to the ultrafiltration step, since it can be carried out more slowly at ordinary temperatures such as 20 to 30° C., to give a satisfactory product.

Arrangement of the ultrafiltration operation

The ultrafiltration is carried out on the dilute starting sol first in such a way as to reduce the sodium ion concentration. The sol can be diluted with water and reconcentrated by ultrafiltering. However, it is advantageous to add water while simultaneously withdrawing the sodium salt solution from the sol. The ultrafiltration can be carried out in a series of filters, each operating at a constant composition of sol. The purification and concentration is carried out until the silica sol concentration reaches at least about 30% $SiO_2$ and the sodium normality is less than 0.05 N.

A preferred aspect of the process of this invention is that the sol from which most of the salt has been removed (i.e., less than 0.05 N) is heated at 100° C. for from 6 to 24 hours, or at up to 200° C. for progressively shorter periods of time in order to reduce the porosity of the silica particles. The particles formed in the presence of sodium sulfate contain adsorbed sodium and have a specific surface area much higher than that corresponding to the exterior surface of the particles. However, after the salt concentration has been reduced to 0.05, preferably to 0.02 N to 0.03 N, the sol is then heated to about 100° C. or higher until the specific area of the silica as determined by titration, as described by G. W. Sears, Jr. (Analytical Chemistry, 28, 1981, December 1956) is reduced to about $3000/D$, where D is the average diameter of the particles of silica as determined in electron micrographs. Alternatively, the size of the densified particles can be determined by heating the sol for 24 hours at 100° C. and then titrating to determine surface area of the particles, which are then completely densified. For the production of suitable densified particles, somewhat shorter times and temperatures can be employed, but, generally speaking, the time and temperature will be such that the specific surface area will be no more than 10% or 20% higher than $3000/D$, where D is the diameter of the densified particles.

The densified particles can then be concentrated to a higher concentration without reaching an impractically high viscosity. Thus the suitably heated and densified sol, adjusted to a pH of 10, concentrated to about 30% by weight, should have a viscosity of less than about 50 centipoises.

It has been discovered that if all of the salt or electrolyte such as sodium sulfate is removed from silica sol by ultrafiltration, the sodium ions which provide the positive charge to neutralize the negative charge on the silica sols are not removed and the sol retains a pH of above 8. In the pH range of 8 to 10, the particles are highly charged and do not aggregate. However, if such a sol is concentrated to above about 30% SiO, as in the case of 15 millimicron particles, the viscosity increases rapidly. The sols become so viscous that flow is slow through the apparatus and ultrafiltration becomes exceedingly slow.

If a small but well defined concentration of salt is left in the sol, it can then be concentrated further before the viscosity begins to increase. The amount of sodium sulfate, for example, that is required to minimize viscosity for ultrafiltration at concentrations over 30% silica is in the range of about 0.005 N, to 0.05 N. The preferred range is 0.02 to 0.03 N.

Accordingly, in the process of this invention, as the sol is being purified and concentrated, the sulfate concentration in the later stages of the purification should not fall below this preferred range. When this concentration of sodium sulfate is obtained in the sol, then the silica is concentrated by ultrafiltration without further addition of water.

The following examples further illustrate this invention.

EXAMPLE 1

A tubular ion exchange apparatus was assembled as follows:

The ion exchange tubing was made of a sulfonated fluorocarbon ether polymer of the type described in U.S. Pat. 3,282,875. The tubing had an inside diameter of 0.100″ and a wall thickness of 0.005″. There were 52 tubes each 15″ long and extending from one header to the other and dipping in the form of a U into a container filled with acid. The calculated surface area of the tubing was 1.7 sq. ft. The pump circulating the silica sol developed a pressure of 5 p.s.i., and circulated the sol through the tubing at a rate of 4 liters per minute. An acid pump circulated acid from the bottom to the top of the acid container at a similar rate.

By placing one normal sulfuric acid in the acid container outside of the tubes and water containing a trace of alkali at pH 9 inside the tubes, and then circulating both solutions and maintaining the pH of the water inside the tube at 9 by continuous addition of sodium hydroxide solution, it was established that the exchange rate through the tubing was about 0.5 equivalent per hour at 30° C.

A sol of colloidal silica having a specific surface area of 358 m.²/g. and a particle size of around 8 millimicrons, containing 11% by weight of silica, was prepared by placing 1700 mls. of water and 50 mls. of 95% sulfuric acid in the acid tank and 1000 mls. of water in the tank in which the sol was to be made and then circulating the two solutions and heating until a temperature of 50° C.

was attained in the circulating sol, and then a solution of sodium silicate containing 15 grams of $SiO_2$ per 100 mls. of solution and alkali equivalent to 4.6 grams of sodium oxide per 100 mls. of solution was added at such a rate as to maintain the pH of the circulating sol between 8.0 and 9.5.

Since it is difficult to actually measure the pH of a hot alkaline solution, a small amount of sol was continually withdrawn from the sol tank at a rate of 50 mls. per minute and passed through a cooler to reduce the temperature to 30–35° C., at which point the pH was measured and the sol then returned continuously to the sol tank. The time lag between removing the hot sol and measuring the pH of the cold sol was about 30 seconds. The pH was measured with glass electrodes, using a pH meter with a temperature adjustment.

The sodium silicate solution was fed through a metering pump and flowmeter. Since excess acid was present in the acid system, the rate of exchange of sodium ions for hydrogen ions was relatively constant, and the rate of addition of sodium silicate was 400 mls. in 2.9 hours, or 138 mls. per hours. The normality of the alkali in the solution was about 1.5, so that the exchange rate was about 0.2 equivalent per hour, or 0.12 equivalent per hour per square foot of membrane area.

The final pH of the sol was 9.0.

EXAMPLE 2

In this example the equipment and techniques described in Example 1 were used in making a sol at high pH.

The sol tank was filled with 950 mls. of water and 100 mls. of sodium silicate solution containing, per 100 mls., 15 grams of $SiO_2$ and alkali equivalent to 4.6 grams of $Na_2O$. This solution was prepared by diluting a commerical water glass solution containing 28.6% by weight of $SiO_2$ and 8.8% by weight of $Na_2O$ equivalent alkali. Water was placed in the acid tank in an amount of 1700 mls. and the solutions were circulated while the temperature was raised to 80° C. Then 100 mls. of 95% sulfuric acid were carefully added to the acid tank in a thin stream, giving a solution which was approximately 1 molar in sulfuric acid. At this time, the pH of the circulating silicate solution was 10.75, but within 8 minutes the pH had dropped to 9.5. More of the sodium silicate solution containing 15 grams of $SiO_2$ per 100 milliliters was added over the next hour at a relatively constant rate to maintain the circulating silica sol at a pH between 9.5 to 10.0. During the first 15 minutes, the exchange rate was 1.2 equivalents per hour, while in the later 45 minutes the rate dropped to 1.0 equivalent per hour. The process was continued for a total of 2 hours, and during the last hour the rate of addition of silicate was such that the pH was maintained between 10.0 and 10.3, and the average exchange rate was 0.55 equivalent per hour.

Analysis of the resulting transparent sol indicated that it contained 11.5 grams of $SiO_2$ per 100 mls., and had an alkalinity corresponding to a normality of 0.1. It also contained 0.7% sodium sulfate.

During the operation, a considerable amount of water was removed into the acid due to osmosis through the membrane. The final volume of sol was 1200 mls., and this contained 138 g. of silica. The silica in the sodium silicate solution that was fed was 140 g. This indicated good recovery of silica as colloid.

Of the total 1.4 equivalents of base in the sodium silicate used, about 1.3 equivalents were neutralized by the 3.6 equivalents of acid; evidently excess acid was present. During the latter part of the preparation, the exchange rate decreased while operating at pH 10. This decrease was believed to be due to the deposition of some silica inside the walls of the ion exchange tubing which contained some white film.

EXAMPLE 3

The ion exchanger used was the same as that at the end of Example 2, with rinsing, but no removal of deposited silica.

In a further preparation of colloidal silica, operating the ion exchange process so that the sol was maintained at about pH 10, equipment and procedures were used similar to those described in Example 1. About 950 mls. of water were placed in the sol system and 1000 mls. of water in the acid system. These were circulated until a temperature of 70° C. was attained, at which point then 85 mls. of the sodium silicate solutions containing 15 grams of $SiO_2$ per 100 mls. as described previously were added to the sol system and 100 mls. of 95% sulfuric acid to the acid system. Further sodium silicate solution was then added at a rate to maintain the pH between 10.0 and 10.5; most of the time the pH was about 10.25. During a two hour period, the rate of addition of the sodium silicate solution was 150 mls. per hour, and since the alkali content was 1.5 N, the exchange rate thus equaled 0.225 equivalent per hour. The temperature during most of the run was maintained between 75 and 80° C. It appeared that the ion exchanger was operating even at lower capacity than in Example 2, and there was visible evidence of a silica deposit within the ion exchange tubing. The sol contained about 6% silica.

EXAMPLE 4

The ion exchange process was operated using the apparatus of Example 3 after cleaning it of silica deposits by rinsing with 5% solution of NaOH and then with water. Sodium silicate solution was added so that the pH was maintained at 9, while the temperature was held at 80° C. Initially, 950 mls. of water were placed in the sol system and 1700 mls. of water in the acid system, and both were circulated with heating until the temperature reached 80° C. Then 15 mls. of the sodium silicate solution containing 15 grams of $SiO_2$ per 100 mls. and alkali normality of 1.5 N was added to the sol system, and 184 grams or 100 mls. of 95% $H_2SO_4$ was added to the acid system, giving a normality of about 2.0, the total acid equivalents being 3.55. The sodium silicate solution was then added to the sol system to maintain pH from 8 to 9. A total of the silicate solution fed was 1200 mls., or 1.8 equivalents of base. At this point the ion exchange rate was drastically decreased, evidently due to the fact that after the sulfuric acid was converted to sodium bisulfate the exchange rate was much lower, using this particular type of ion exchange membrane. The initial exchange rate corresponded to 1.26 equivalents of base per hour, or about 0.75 equivalent per square foot of membrane per hour; when the sulfuric acid had been converted to sodium bisulfate, the rate had dropped to 0.52 equivalent per hour, or 0.3 equivalent per hour per square foot of membrane area.

The silica concentration was about 13.6 grams per 100 mls., and was clear and fluid, but at this point the rate of addition of silicate solution was reduced so that the pH dropped to about 8.0, and the sol became cloudy and viscous due to the unfavorable combination of low pH and high concentration of sodium sulfate which had at this point increased to approximately 0.14 normal in the sol due to migration of sulfate ion through the membrane from the relatively strong acid solution. The sol was cloudy and gelatinous.

EXAMPLE 5

An apparatus was constructed using ion exchange membrane tubing of the type known as XR polymer, which is the type described in U.S. Pat. 3,282,875. The ion exchange tubing was 0.10″ diameter with a wall thickness of 0.005″. There were 150 tubes, each 24″ long, giving a total of about 8 sq. ft. of ion exchange surface area. The tubes were mounted in a tank so acid could contact the outside of the tubes. 1400 mls. of water were put in the sol tank, which was connected so sol could circulate from the tank through the tube bundle and return to the tank. 3500 mls. of water were put in the acid tank. The water was heated to 80° C. by circulating the water in the sol tank through a heat exchanger, and through the ion exchange tube bundle while stirring the water in the acid tank with an agitator. A feed solution of sodium silicate was prepared by diluting commercial sodium silicate to 1400 mls. volume containing 10 g. of $SiO_2$ and 3.1 g. of $Na_2O$ per 100 milliliters. Then 150 mls. of 95% sulfuric acid previously diluted with 300 mls. of water was added to the acid tank, and the silicate solution was fed at a constant rate to the sol tank, so as to hold the pH of the solution in the tank at between 9.0 and 9.2. The temperature of the sol was held at 78 to 82° C. The solution returning from the exchanger to the sol tank was held at a pH between 8 and 9. During the first 10 minutes, a total of 360 mls. of the silicate solution were fed in, and over the next 10 minutes, 800 mls., and over the next 5 minutes, 240 mls. were added. This corresponded to a total of 1400 mls. of the silicate solution, which was 1.0 N in alkali, or 1.4 equivalents of alkali, which was neutralized in 25 minutes. The overall rate of neutralization was therefore 0.42 equivalent per sq. ft. per hour.

The silica sol which was obtained had a volume of 2440 mls. and contained 5.7 grams of $SiO_2$ and 0.7 gram of $Na_2SO_4$ per 100 mls. The sol had lost 360 mls. of water through the membrane into the acid due to osmosis. The sol was concentrated by circulating it over a microporous membrane of a Model TC-3 Amicon ultrafilter at an inlet pressure of 15 p.s.i. and an outlet pressure of 0 p.s.i., at 80° C. for 30 minutes. The membrane was Type PM-10, and the total usable area of membrane was 0.5 square feet. The ultrafiltrate amounted to 1700 mls. of clear solution containing 0.75 gram sodium sulfate per 100 mls. A sol, 740 mls. in volume, containing 18 grams of $SiO_2$ and 0.65 gram of $Na_2SO_4$ was obtained. This sol contained silica having a specific surface area of 360 m.$^2$/g. as determined by titration. The sol was diluted to 2920 mls. volume with distilled water. Then it was again concentrated by ultrafilration to 740 mls. and contained 18 grams of $SiO_2$/100 mls. and 0.15% $Na_2SO_4$. It was then further concentrated by ultrafiltration until it contained 37 grams of $SiO_2$ per 100 mls., and the sodium sulfate content was 0.07%. The clear sol had a pH of 9 and was stable in storage at 25° C. for more than 6 months.

EXAMPLE 6

This is an example of preparing a concentrated silica sol by ion exchange using equipment similar to that used in Example 5, but a more dilute solution of sodium silicate was fed to the sol tank and simultaneously sol was withdrawn from the sol tank and circulated through an ultrafilter to remove water and soluble salts and concentrate the silica while the solution was being ion-exchanged as more silica was added in the form of sodium silicate. Two liters of water were placed in the sol tank, and 3 liters of water in the acid tank. Water was circulated through the heat exchanger and ion exchange tubing until the temperature of the water in the sol and acid tanks had reached 90° C. Then 500 mls. of dilute sulfuric acid containing 350 grams of 100% $H_2SO_4$ was added to the water in the acid tank, while at the same time a dilute solution of sodium silicate containing 5 grams of $SiO_2$ and 1.55 grams of $Na_2O$ per 100 mls. was added to the sol tank at an initial rate of 115 mls. per minute. This was sufficient to maintain the sol being formed at a pH between 8.5 and 9.5. As more colloidal silica was formed and the buffer capacity of the sol increased, it was possible to maintain the pH at 9.0±0.2 by careful regulation of the rate of addition of the sodium silicate solution. Simultaneously, sol was withdrawn from the sol tank and passed over an ultrafilter having a surface area of 0.5 sq. ft. of PM-10 membrane manufactured by the Amicon Corp., at an inlet pressure of 15 p.s.i. and an outlet pressure of 0, the sol being returned to the sol tank. Water containing sodium sulfate was initially removed through the ultrafilter at a rate of 70 to 100 mls. per minute, but when the silica concentration reached about 1% the filtration rate dropped to 35 mls./min. and thereafter progressively decreased. The circulating sol was maintained at a temperature of 90° C. A total of 5.6 liters of the dilute sodium silicate solution was added while 1.3 liters of ultrafiltrate containing 0.026 equivalent of sulfate ion was removed and at the same time 1 liter of water had been transferred by osmosis into the sulfuric acid solution. The sulfuric acid initially contained 7.3 equivalents of acid, and had a normality of 2.08, while at the end of the run, the acid normality was 1.02 and there remained 4.6 equivalents of acid, indicating that 2.7 equivalents of acid had been utilized in neutralizing the alkali of the sodium silicate.

Of the total of 2.8 equivalents of alkali in the sodium silicate fed to the system, 2.7 equivalents had been transferred as sodium ions through the membrane into the acid, while 0.2 equivalent of sulfate had migrated through the membrane into the sol, giving a sodium sulfate concentration of 0.038 normal.

The sol contained 5.2 grams of $SiO_2$ per 100 mls. and was stabilized with alkali at a concentration of 0.016 N, resulting in a pH of 9.25. The particle size of the colloidal silica was about 11 millimicrons; specific surface area was 252 m.$^2$/g. The sol was clear and transparent, with a slightly bluish haze.

At this point, a portion of the sol was concentrated by ultrafiltration to 30% $SiO_2$ by weight. The final concentration of sodium sulfate in the sol was 0.03 N, and the pH was 9.

EXAMPLE 7

The same apparatus was used as in Example 6, but the ultrafilter was first cleaned by circulating a 5% solution of sodium hydroxide through it at 90° C. for 15 minutes to dissolve the silica from the microporous filter membrane, and rinsing thoroughly with water.

As a "heel," of colloidal silica to serve as nuclei for the growth of larger particles, 2 liters of a sol containing 2.2 grams of $SiO_2$/100 mls. obtained by diluting the initial 5.2 g./100 mls. sol of Example 6 was placed in the sol tank and circulated until the temperature reached 85° C. In the acid tank there remained 0.5 liter of residual acid from Example 6, having a normality of 1.02, but this was below the level of the exchange membrane. Then 350 grams of 100% sulfuric acid along with sufficient water to form a dilute solution of 3.5 liters was added to the acid tank, and simultaneously a dilute solution of sodium silicate containing 5 grams of $SiO_2$ and 1.55 grams of $Na_2O$ per 100 mls. was added to the sol tank at a rate of 115 mls./minute, maintaining the pH of the circulating sol at 9.0±0.2.

Over a period of 97 minutes, a total of 7 liters of dilute sodium silicate were fed to the sol tank while 5.3 liters of ultrafiltrate were removed, containing 0.035 N sodium sulfate. The ultrafilter did not become blocked with silica, since silica nuclei were present from the beginning of the run. At the same time, 1.45 liters of water was extracted from the sol into the sulfuric acid by osmosis.

As the reaction progressed, and a larger portion of the acid became converted to sodium bisulfate, the rate of ion-exchange decreased and the rate of addition of sodium silicate solution was reduced accordingly, in order to maintain the pH at the desired point of about 9.0. The overall rate of ion-exchange at 90° C. whereby the sulfuric acid was converted to sodium bisulfate was 0.33 equivalent/hour/sq. ft. of membrane. Of this ion exchange, about 90% was due to the transfer of sodium ions from the sol to the acid, while about 10% was due to migration of sulfate ions into the sol, there forming sodium sulfate.

The acid was converted entirely to a sodium bisulfate solution, the acidity corresponding to 0.66 N, while the sulfate ion concentration was 1.32 N, indicating that half of the hydrogen ions of sulfuric acid had been neutralized by sodium, thus forming NaHSO₄. This recovered acid solution was evaporated to produce crystalline sodium bisulfate as a dry granular material.

The resulting 2.06 liters of colloidal silica contained 17.4 grams of $SiO_2$/100 mls., had a pH of 9.4, and contained sodium sulfate at a normality of 0.063. The specific surface area was 150 m.²/g., corresponding to particles about 18 millimicrons in diameter. The sol was clear but had a bluish opalescence due to light scattering. In this operation, 350 grams of silica were added as sodium silicate to 44 grams of silica in the sol used as "heel." Thus, the "build-up ratio" or the ratio of final weight of silica divided by the initial weight of silica was about 9. If all of the incoming silica had been deposited upon the nuclei originally present in the heel, then the specific surface area of the sol produced should have been $(9)^{-1/3}$ (252), or 121 m.²/g. The sol was actually found to have a specific surface area of 150 m.²/g., indicating that most of the added silica had been deposited upon the heel particles, while there had also been some spontaneous particle growth.

A small portion of the sol having a specific surface area of 150 m.²/g. was concentrated by ultrafiltration to 40% by weight of $SiO_2$, and the final concentration of sodium sulfate in the concentrated sol was 0.04 N.

EXAMPLE 8

Using the same equipment as in Example 7, 1.8 liters of the sol of Example 6 containing 17.4 g. of $SiO_2$/100 mls. was left in the sol tank as a heel for the further growth of the particles. This was circulated and heated to 90° C. In the acid tank there remained 0.5 liter of sodium bisulfate solution from Example 6, to which was added 3.5 liters of warm dilute sulfuric acid containing 350 grams of 100% $H_2SO_4$. Simultaneously with the addition of this acid to the acid tank, the feed of dilute sodium silicate solution containing 5 grams of $SiO_2$ and 1.55 grams of $Na_2O$ per 100 mls. per minute was started to the circulating, hot sol "heel." Over a period of 69 minutes, a total of 8.6 liters of the dilute sodium silicate solution were added at a slowly decreasing rate as required to maintain the pH at about 9, while the ultrafilter removed 5.34 liters of ultrafiltrate containing sodium sulfate with a normality of 0.035 with no evidence of plugging. Also 1.1 liters of water were removed from the sol by osmosis into the acid solution. Most of the acid was converted to sodium bisulfate, there being produced 5.1 liters of solution having an acid normality of 0.78 and a sulfate normality of 1.46.

Five liters of sol containing 17 g. of silica per 100 mls. was obtained. The silica had a specific surface area of 125 m.²/g. The sol showed a stronger bluish opalescence than that of Example 6, but was still very fluid and translucent. It contained sodium sulfate with a normality of 0.055 and a pH of 9.3. The build-up ratio was 2.4, from which it is calculated that the particles in the "heel" sol of 150 m.²/g. should have grown to larger particles having a specific surface area of 112 m.²/g., whereas the actual value found was 125 m.²/g. The sol was concentrated to 40% by weight of $SiO_2$ by ultrafiltration, reducing the $Na_2SO_4$ normality to 0.04, after which it was further concentrated to 50% by weight of silica by vacuum evaporation.

EXAMPLE 9

This is an example of producing a sol containing about 32% by weight of $SiO_2$ in the form of particles having a specific surface area of 180 m.²/g., or a particle diameter of 15 millimicrons in a single batch operation. The equipment is the same as that used in Example 8. Thirty-five hundred mls. of 3.0 N sulfuric acid were placed in the acid compartment and 3 liters of water in the sol tank, and a solution of sodium silicate having an $SiO_2/Na_2O$ weight ratio of 3.25/1.0 and a silica concentration of 5 grams of $SiO_2$/100 mls. was fed at a rate of about 125 mls. per minute to the circulation solution at 90° C. in the sol tank. Over a period of 90 minutes, a total of 10.4 liters of the dilute sodium silicate solution were added, the rate being decreased to 75 mls. per minute toward the end of the period, to maintain the pH of the circulating sol at 9±0.3.

At the same time, sol was withdrawn from the sol tank and circulated across the membrane of the ultrafilter and back to the sol tank to remove water and sodium sulfate through the ultrafilter membrane initially at a rate of 79 mls. per minute. Within the first 20 minutes of operation while the silica particles were being nucleated, the ultrafilter became plugged and would pass water only at a rate of about 10 mls. per minute. Accordingly, after the first 20 minutes of operation of the process, the acid was withdrawn from the acid tank to stop further ion exchange, and the feed of sodium silicate solution was essentially stopped, although a few milliliters were added to maintain the pH of the sol at about 9. Within a half hour period, the ultrafilter was rinsed, then cleaned by circulating 10% sodium hydroxide through it at a temperature of 90° C. for 10 minutes to dissolve silica from the pores of the ultrafilter. The equipment was then thoroughly rinsed by running hot water through it and again connected to the sol tank. The ion exchange operation was then resumed by continuing the addition of sodium silicate when the acid had been restored to the acid tank. The rate of ultrafiltration was 79 mls. per minute, and at no point thereafter did it decrease to the rate observed after it was exposed to nucleating silica particles. After a total period of ion exchange of 90 minues, excluding the time required for cleaning the ultrafilter, the circulating sol contained 16 grams of $SiO_2$/100 mls. and was very clear but faintly opalescent, due to the presence of the colloidal silica particles. The residual acid was removed from the acid tank and circulation continued through the apparatus and through the ultrafilter, while additional water and sodium sulfate were removed until the concentration of silica reached 39 grams of $SiO_2$/100 mls., or 32% by weight of $SiO_2$. At this stage, about 90% of the sulfuric acid had been converted to sodium bisulfate. The silica sol was drained from the system and based on the yield of concentrated sol recovered along with more dilute sol obtained by rinsing the system, an overall yield of 93% of the original $SiO_2$ contained in the sodium silicate was obtained.

The pH of the final sol was 8.9; it contained sodium sulfate at a concentration of 0.054 N. The sol was transparent but opalescent, and had a viscosity of 1.3 cps. at 25° C. The sol had shown no marked increase in turbidity or viscosity while it was being circulated at 90° C. for 1 hour as it was being concentrated, indicating good stability.

I claim:

1. A process for increasing the size of colloidal silica particles in an aqueous silica sol containing from about 1 to about 40 weight percent silica particles having a diameter of at least 5 millimicrons, the sol having a temperature of about 60 to about 100° C. and a pH of 8 to 9.5, consisting essentially of contacting the sol with a cation exchange membrane in contact with a strong acid selected from the group consisting of hydrochloric acid and sulfuric acid, to remove cations from the sol, adding water and sodium silicate to the sol to maintain the pH of the sol from 8 to 9.5 and maintaining the concentration of sodium salt formed by migration of anions from the acid to the sol in the range $N=0.005$ to $N=0.26-0.005C-0.0012\,(T-40)$, where N is the normality of the sodium salt, T is temperature in degrees centigrade and C is grams of silica per 100 milliliters of sol when C is less than 30 and when C is at least 30, from N=0.005 to N=0.158−0.0012T.

2. The process of claim 1 wherein the sodium salt formed by migration of anions from the acid to the sol is removed by filtering an aqueous solution of the salt from the sol using a microporous membrane having pores smaller than the silica particles.

3. The process of claim 2 wherein the strong acid is sulfuric acid.

4. The process of claim 2 wherein the sodium silicate has a $SiO_2:Na_2O$ ratio of 3.25:1.

5. The process of claim 2 wherein the pH is 9.

6. The process of claim 2 wherein the temperature is 90° C.

References Cited
UNITED STATES PATENTS

| | | | |
|---|---|---|---|
| 2,574,902 | 11/1951 | Bechtold et al. | 252—313 S |
| 3,211,518 | 10/1965 | Acker et al. | 252—313 R X |
| 3,282,875 | 11/1966 | Connolly et al. | 260—87.5 R X |
| 3,440,174 | 4/1969 | Albrecht | 252—313 S |
| 3,560,400 | 2/1971 | Chilton | 252—313 S |

RICHARD D. LOVERING, Primary Examiner

U.S. Cl. X.R.

252—314